Figure 1:
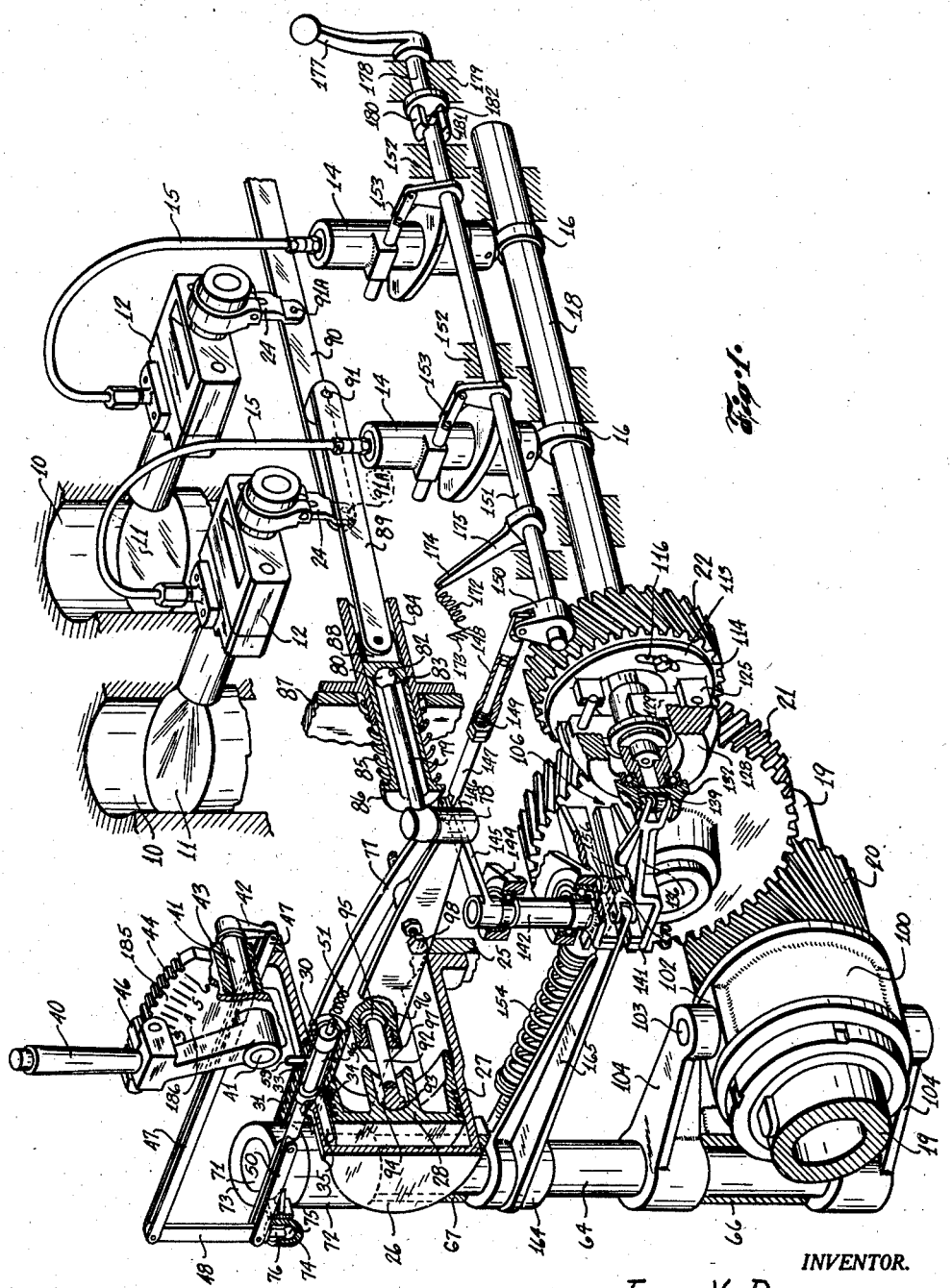

Jan. 10, 1939.  T. V. PEDERSEN  2,143,168
SPEED CONTROL SYSTEM FOR INTERNAL COMBUSTION ENGINES
Filed May 18, 1936  3 Sheets-Sheet 1

INVENTOR.
TAGE V. PEDERSEN
BY
ATTORNEY.

Jan. 10, 1939.　　　T. V. PEDERSEN　　　2,143,168

SPEED CONTROL SYSTEM FOR INTERNAL COMBUSTION ENGINES

Filed May 18, 1936　　　3 Sheets-Sheet 2

INVENTOR.
TAGE V. PEDERSEN
BY
ATTORNEY.

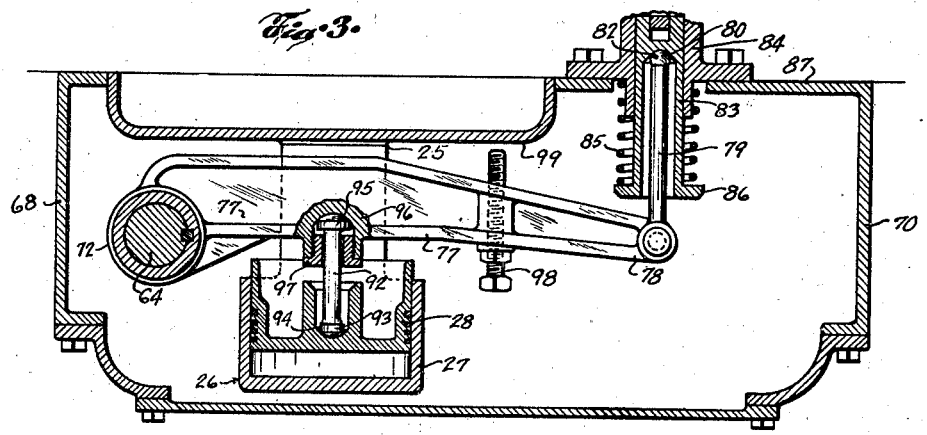

Patented Jan. 10, 1939

2,143,168

UNITED STATES PATENT OFFICE 2,143,168

SPEED CONTROL SYSTEM FOR INTERNAL COMBUSTION ENGINES

Tage V. Pedersen, Beloit, Wis., assignor to Fairbanks, Morse & Co., Chicago, Ill., a corporation of Illinois Application May 18, 1936, Serial No. 80,245

6 Claims. (Cl. 123—140)

This invention relates to improvements in speed control systems for internal combustion engines, and more particularly to a method and means for selectively determining the engine speed within its operative speed range, and for maintaining the engine speed as thus determined, substantially constant throughout variations in engine loading.

The control system embodying the improvements of the present invention is designed to provide a positive regulation of engine speed through a control of the engine fuel feeding mechanism. The control system is applicable particularly to engines of the solid injection type, and for this reason the system will be exemplified as applied to an engine of this type, although it will be understood that the system presently to be described, may be employed as well in engine organizations embodying fuel feeding provisions of other types.

In an engine of the type noted, where it is desired to maintain operation at a constant, predetermined speed during variable loading of the engine, it will be readily understood that some means must be employed for regulating the fuel input to the engine in accordance with variations in loading thereof. In the prevailing engine organizations, an engine-operated governor of any well-known type, is generally employed to effect such control. Where it is desired further to control the engine so as to effect operation at different desired engine speeds over a chosen range, additional control mechanism is required for regulating the pressure of fuel injection to the engine, and preferably also to regulate the timing of injection. Moreover, it is generally necessary to adjust the engine governor in accordance with the selected speed setting, so that the governor may function to best advantage in maintaining at a constant value the selected speed, despite variations in engine loading.

It may be noted that the terms "control", "control mechanism", and the like, are utilized herein to denote those members, elements or agencies which individually or cooperatively exert a controlling or regulating influence on any of the operating characteristics of the engine, irrespective of whether the member, agency or organization is or is not subject to direct personal manipulation.

It will be readily understood from the foregoing, that in order to facilitate a positive and ready control of the engine, and at the same time to insure the most efficient coordination of the several controls, there is greatly to be desired a system or means for coordinating the adjustment of the engine governor, with the speed setting of the engine fuel feeding mechanism, wherein the actuation of but one control device effects both adjustments simultaneously, and serves to effect, independently of the personal equation, the best relative settings of the several adjustments. Such a unified control would provide a positive and coordinate regulation of the engine-speed-determining mechanisms, and at the same time a control which may be readily and easily operated, either at the engine or at some point remote therefrom, as through suitable remote-control apparatus. Hence it is an object of the present invention to provide, in an engine organization of the type noted, an engine operated governor or speed control device, and an improved control mechanism for setting the speed of the engine by adjusting the governor and improving the engine operation by adjusting the fuel feeding mechanism, in which the several controls are operatively coordinated for regulation by a single operator device. The control system contemplated by this invention serves not only to effect adjustments of the engine governor and speed setting mechanisms, but is further adapted to permit the governor mechanism, when once adjusted for a chosen engine speed, to function independently of the speed setting control in maintaining the engine speed substantially constant during variations in engine loading.

Another object is attained in the provision of an improved engine speed and fuel control system comprising an engine operated governor, a speed setting control for conditioning the engine for operation at a predetermined desired speed, and novel mechanism for connecting the governor mechanism with the speed setting control, and at least one adjustment device of the fuel system, whereby actuation of a single manipulative element will effect, in self-coordinated relation, an adjustment of both control mechanisms, the structural arrangement of the connecting mechanism being such as to permit the governor to function independently of the speed setting mechanism, in maintaining the engine speed during variable engine loading; the control system optionally including also an additional control device arranged for operation independently of the governor and speed setting control mechanisms, for stopping the engine.

A further object is to be found in the provision of an improved speed setting control for the purpose noted, in which the adjustments of the fuel injection pressure and the fuel injection timing are effected in coordinated relation and by a single operator device acting through a novel control mechanism, in which the operator device may be manually actuated or automatically operated, as by a remote control system of any suitable type.

Yet another object is to provide a compact and positive acting engine speed and fuel supply control system, in which the adjustments of fuel injection pressure and injection timing are effected in coordinated or synchronous manner through a novel control mechanism obviating the facultative selection by an attendant, of the best positions of the several controls, which are mutually dependent. The correct placement of the controls is thus freed of the personal equation, except for the actuation of a single master control lever. The mechanism herein referred to preferably embodies a fluid-pressure actuated device for operating the control mechanism, and a control for initiating operation of the pressure actuated device.

A still further object is to be found in the provision of an improved engine speed and fuel control system including a spring loaded engine speed governor control, and an engine speed setting control for the purposes hereinbefore noted, wherein the spring loading acts upon the governor through a variable-arm lever, and wherein the two controls are operatively associated through a novel mechanism whereby actuation of the speed setting control for adjusting the injection pressure and injection timing mechanisms, will also adjust the governor through its spring loading, in accordance with the speed setting, so that the latter may function most advantageously in maintaining the engine speed substantially constant during operation of the engine under constant or variable loading; the mechanism coordinating the controls providing for adjustment of the governor speed setting by a variation of the lever arm through which the governor loading acts upon the governor weights. Adjustment of the governor spring in this manner, results in a markedly improved no-load to full-load speed regulation, serving closely to maintain the engine speed at the predetermined value in accordance with the speed setting control.

Yet another object is attained in the provision, in a system of the type described, of a novel engine speed setting control mechanism for determining the speed of engine operation, the mechanism including an actuating device of fluid pressure-operated type wherein the fluid pressure for operating the device is supplied from the engine lubrication system, the arrangement of the pressure-operated device and associated control mechanism being such that, upon a failure of fluid pressure in the engine lubricating system, the actuating device and associated control mechanism operate to reduce the engine speed to idling, or if the engine is operating under considerable load, to prevent further operation.

Figure 2:
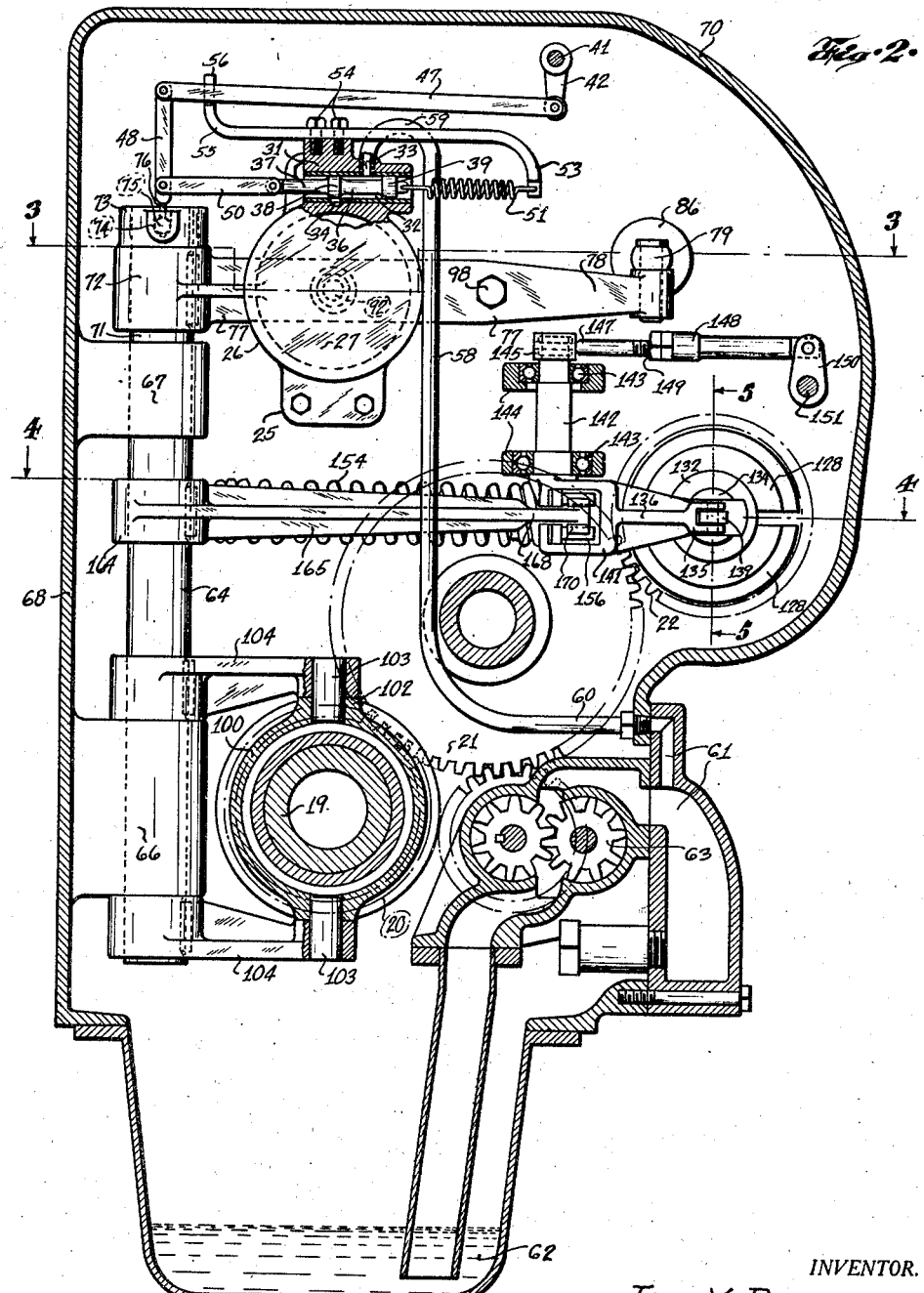

Further objects and advantages will be found from the following description and from the drawings, in which:

Fig. 1 is a view in perspective of a control mechanism embodying the improvements of the present invention, certain of the elements being shown in section; Fig. 2 is a transverse section of an engine organization showing a portion of the engine housing containing the engine control mechanism and the preferred arrangement of the mechanism therein; Fig. 3 is a horizontal section through the control mechanism housing and a portion of the control mechanism enclosed thereby, the section being taken along line 3—3 in Fig. 2; Fig. 4 is a horizontal section through the housing and a portion of the control mechanism therein, this section being taken along line 4—4 in Fig. 2, and Fig. 5 is an enlarged longitudinal section as viewed along line 5—5 of Fig. 2, showing a preferred form of governor control mechanism included in the control system selected for description as an embodiment of this invention.

It is desired at this time for simplicity of reference in the following description and in the claims, to designate the governor control mechanism as the primary engine speed control, and to refer to the manually regulated speed setting control mechanism, as the secondary engine speed control.

As an example of its application, the control system embodying the improvements of the present invention will be described in connection with an internal combustion engine of Diesel type. However, it is to be understood that the control system presently to be described may, with obvious minor modifications, be applied to engines of other types.

Referring to the drawings and particularly to Fig. 1 thereof, by suitable characters of reference, the numerals 10 and 11 designate respectively a cylinder and piston of an internal combustion engine of solid-injection type. In the drawings, two such cylinder and piston organizations are illustrated, although it is to be understood that the control system now to be described, may be applied to either a single or multi-cylinder engine. In the present illustration, each of the cylinder organizations is provided with a fuel injection nozzle structure 12 which is supplied with fuel from a fuel pump 14, as by a connecting fuel conduit 15. The fuel pump 14 which may be of a conventional or any suitable type, is arranged to be actuated by a cam 16, which is secured to and driven by a camshaft 18. The camshaft 18 is driven from the engine crankshaft 19, as by a gear 20 operatively connected to the crankshaft in a manner presently to be described, the gear 20 meshing with an idler gear 21, and the gear 21 in turn meshing with a gear 22 mounted on and operatively connected to one end of the camshaft.

The output of the fuel pumps of the quantity of fuel delivered by the pumps to the injection nozzles, is controlled by a primary control mechanism which may be the usual engine operated governor. The details of the governor or primary control, and its connection to the fuel pumps will be hereinafter more fully described.

Each fuel injection nozzle 12, which may be of a conventional type suitable to the needs of the particular engine to which it is applied, is fully adjustable for permitting the injection pressure to be regulated to correspond to a given engine speed. The adjustment of the nozzle injection pressure is effected by means of a rotatable or rockable arm 24, the arm having an operative connection in the usual manner (not shown) with the needle valve loading means such as a spring, (not shown), within the nozzle housing. The adjusting arm 24 is, by preference, arranged to be operated by a secondary control or engine speed setting mechanism now to be described.

The secondary control mechanism which embodies certain features of the present invention, comprises an actuating device or motor 26, which is by preference of a fluid-pressure operated type, utilizing, in the present example, as a source of fluid under pressure for its operation, the lubricating fluid from the engine lubrication system. The motor 26 is of the general type known in the art as a "servo-motor", and comprises a cylinder 27 which may be secured to a portion of the engine frame, as at 25, a piston 28 operable therein and a valve mechanism 30, the valve mechanism controlling the admission of fluid to the servo-motor cylinder, for effecting movement of the piston.

The valve mechanism comprises a valve casing 31 having a chamber 32 therein, a fluid inlet port 33 and a fluid outlet port 34, a passage 35 connecting the valve chamber outlet 34 with the cylinder 27, and a valve 36 of plunger type operable in said casing. The valve plunger may be of well-known construction, comprised of a plunger body 37 having enlarged portions or heads 38 and 39 spaced thereon, the plunger being so operatively arranged with respect to the fluid inlet 33 that the input of fluid to the valve chamber will always occur between the enlarged portions of the plunger. The enlarged portion 39 forms a closure for one end of the valve chamber, and serves as a guide for the plunger element. The enlarged portion 38 which is spaced from the portion 39 inwardly of the valve chamber, acts, also, as a guide for the plunger, and serves as the valve element proper for controlling the admission and discharge of the fluid to and from the servo-motor, through the outlet 34.

In the present example, the structural arrangement of the servo-motor elements is such that a slight leakage of fluid occurs between the mating surfaces of the piston and cylinder, the loss of fluid at this zone being constant throughout normal operation of the engine. To compensate for this loss of fluid, the valve element 38 of valve plunger 36, is so formed as to permit a slight flow of fluid from the valve chamber into the cylinder 27 of the motor, when the valve is disposed, as normally in its closed position. This leakage inflow of fluid from the engine oil system, of course under pressure, is sufficient to make up the loss of fluid due to the intended small degree of leakage past the piston, hence the fluid pressure within the cylinder may be maintained fairly uniform for holding the piston stationary against an external counteracting force later to be described, when the piston has been operated to a predetermined position as a result of the operation of the motor valve by the secondary control actuating mechanism now to be described.

As illustrated in Fig. 1, the valve plunger 36 is arranged for actuation by an operating lever 40. The lever is carried by and operatively connected to one end of a stub shaft 41, the opposite end of the shaft having a crank arm 42 connected thereto. The stub shaft 41 is, by preference, journalled in a bearing portion 43 which may be mounted upon or formed as a part of the engine frame. Also the bearing member supports a notched member or rack 44, the notches therein being selectively engaged by a retractible locking element or detent 46 carried by the lever 40, the described lever and locking structure being well known in the art. The free end of the crank arm 42 is pivotally connected to one end of a double bar link 47, the opposite end of this link being pivotally connected to one end of a lever element 48. The opposite end of lever 48 is in turn pivotally connected to one end of a second double bar link 50, with the opposite end of the latter pivotally connected to one end of the valve plunger body 36. As will appear from Figs. 1 and 2, the lower portion of the lever element 48 is provided with a ball end, occupying a socket, through which provision is made for shifting, at times, the pivot point of lever 48. This portion of the structure and its purpose, are hereinafter more fully described. From the description thus far of the secondary control mechanism, considered in connection with Figs. 1 and 2, it will be readily observed that upon a retraction of the stop element 46, the control arm or operator 40 may be actuated so as to effect a desired movement of the valve plunger, whereby to admit fluid to the servo-motor cylinder, or to effect a discharge of fluid therefrom. As a means for taking up lost motion in the described valve operating linkage system, and for constantly urging the valve plunger 36 toward a position to close the valve outlet port 34, a spring 51 of suitable capacity is arranged to act upon the free end 52 of the valve plunger, one end of the spring being connected to the plunger while the opposite end thereof is connected to the free end of a spring anchorage arm 53. As shown in Fig. 2, the arm 53 is secured, as by bolts 54, to the valve casing 31, and has its spring supporting end preferably so disposed, relative to the casing, as to secure the spring in axial alignment with the valve plunger. A second arm portion 55 which may be formed as a continuation of arm 53, is extended from its support on the valve casing, toward one end of the double bar link 47, and has its free end 56 disposed between the bars of the link, so that the arm serves as a guide therefor.

The servo-motor valve chamber 32 is supplied with oil from the engine lubricating system through a conduit 58 (Fig. 2), having one end 59 in communication with the valve chamber inlet port 33, and the opposite end 60 thereof communicating with a chamber 61, the latter chamber being supplied with lubricating oil from an oil reservoir or sump 62, as by an oil pump 63. In the present example (Fig. 2), the oil reservoir 62 may be a part of the engine crankcase.

Continuing with the description of the secondary control mechanism, a control shaft 64 is arranged adjacent the engine crankshaft 19, and at a right angle thereto, the control shaft being suitably supported by and journalled in bearing members 66 and 67 which are, by preference, secured to a wall 68 of the engine housing 70 enclosing the control mechanism. The end portion 71 of control shaft 64, is provided with a collar 72 keyed or otherwise secured to the shaft end, the collar having an outstanding lug 73 thereon which has its free end formed to provide a socket 74 for the reception of a ball joint 75 which is carried by an extension 76 of the lever 48, (see Fig. 2), the parts 74 and 75 having been heretofore generally referred to in the description of lever 48 and associated elements. Thus movement of control shaft 64 about its axis will effect, through its connection with the valve operating linkage, a control actuation of valve 36 for a purpose which will later appear. The control shaft has secured thereto, by extension from the collar element 72, an arm structure 77 extending outwardly from and at a right angle to the shaft. The free end 78 of the arm 77 is pivotally connected to one end of an arm 79, the latter arm being provided on its opposite end with a ball portion 80, adapted to seat in a socket portion 82 of a hollow cylindrical sleeve element or cross head 83 (Fig. 3). The sleeve 83 is arranged for reciprocatory or sliding movement in a stationary barrel element 84, the sleeve being urged toward one extreme of its movement as by a spring element 85 arranged between a portion of the stationary barrel element 84 and a flange 86 on the outer or free end of the sleeve. The barrel element may be and is by preference, secured to a portion 87 of the engine frame. The end portion of the sleeve providing the socket 82, has formed thereon a lug 88 which is pivotally connected to one end of a lever 89, best appearing in Fig. 1. The opposite end of lever 89 is, in turn, connected to a bar 90 as through a pivotal connection 91. As will be clearly observed in Fig. 1, the bar 90 is arranged for operative connection to the adjusting arms 24 of the injection nozzle structures 12, as through the pivotal connections 91A.

As will be observed in Figs. 1 and 3, the servo-motor 26 is arranged adjacent the arm structure 77, whereby the piston of the servo-motor may be operatively associated with the arm structure so as to effect adjusting movements thereof. The operative connection of the motor piston 28 to the lever arm structure 77 is effected by a rod element 92 having a ball end 93 seated in a socket 94 formed on or in the piston 28, the socket being disposed centrally of the piston, as shown by Fig. 3. The opposite end of rod 92 is provided with a head portion 95 which is seated in a hollow outstanding lug 96 formed on the arm structure 77, the rod and its head portion being maintained in assembly with the arm structure 77, preferably by a securing nut 97 threadedly engaging the hollow lug internally thereof. As shown in Fig. 3, the arm 77 is provided with an adjustable stop element 98 for limiting movement of the arm toward the engine frame portion 99, the stop being preferably provided with a lock or jam nut as shown, for maintaining it in adjusted relation.

As a means for improving the operation of a variable speed engine of the type described, wherein the speed of the engine may be determined at will by means of suitable control mechanism, including the mechanism hereinabove described, it is desirable to effect adjustments in the timing of fuel injection simultaneously with change in engine speed. In the present example it is preferred to effect adjustments in the timing through a phase shift of the cam shaft gear 22, and hence of the cam shaft, relative to the gear 20 which is driven by and in phase with the engine crankshaft 19. As shown in Fig. 1, each of the gears 20, 21 and 22 is of spiral or skewed type, so that, as will be readily observed, an axial displacement of gear 20 on crankshaft 19, without relative angular displacement of these parts, will effect an angular shift or phase displacement of gear 22, through the agency of the intermediate gear 21. In the present example, the gear 20 is arranged for axial movement relative to the engine crankshaft 19 through a feather-key or spline connection which may be of a well known type, hence the structural details thereof will not be described. A shifting collar 100 is operatively associated, in a well known manner, with the slidable gear 20 for effecting sliding movement thereof. Referring particularly to Fig. 2, the shifting collar 100 is provided with diametrically opposed seat portions 102, for the reception of pin elements 103, the pins being carried by collar and gear shifting arms 104. The arms 104 are mounted upon and keyed to the control shaft 64 on each side of the bearing member 66, the bearing member serving in the present example to maintain a suitable spacing of the arms. From the foregoing, it will be observed that rotation of the control shaft 64 will effect, through the arms 104, pins 103 and shifting collar 100, an axial, non-rotative, displacement of gear 20 which displacement will, by reason of the spiral gears, effect an angular displacement or phase shift of gear 22, hence an angular displacement through the camshaft, of the injection pump operating cams 16.

The primary control or engine governor which is designated generally by the numeral 106, the structural features of which will be now described, is operatively associated with the camshaft 18 and gear 22 thereon. Referring particularly to Figs. 1, 4 and 5, the end 107 of camshaft 18 to which the gear 22 is operatively connected in a manner presently to be described, carries a sleeve element 108 which is secured to the shaft end as by a key 109, (Fig. 5). The shaft end 107 and sleeve 108 are journalled preferably in a non-friction or ball bearing assembly 110 which is mounted in a portion 112 of the engine frame. Sleeve 108 is provided with a shouldered flange portion 113 to which the gear 22 is secured; the manner of securing the gear to the sleeve 108 being effected in a well known manner as by bolts 114 extending through slots 116 (Fig. 1) in the sleeve flange and engaging threaded apertures in the body of the gear, (Fig. 5). The slotted connection of the gear to the flange provides a ready means for effecting initial angular or phase adjustment of the gear 22 relative to the cam shaft. As a means for preventing axial displacement of the sleeve and gear relative to the cam shaft, the shaft is provided with a flange 117 which is engaged by the inner end 118 of the sleeve 108, and a securing nut 120 threadedly engaging the shaft and abutting the outer end of the sleeve, (Fig. 5). The shaft end 107 is provided with an extended portion 121 of reduced diameter, serving as a bearing support and guide for a slidable governor sleeve element 122. The slidable sleeve 122 is provided with a flange 124 disposed intermediate its ends for a purpose presently to appear. The flanged portion 113 of sleeve 108, is provided with diametrically disposed paired lugs 125, each pair of lugs serving as bearing members for a pin element 126 which pivotally supports a governor weight element 128. Each of the weight elements 128 is provided with an inwardly projecting arm 129, the inner end of which is adapted to engage the flange 124 on the sliding sleeve 122. Thus during rotation of the cam shaft, and hence of the weights 128, centrifugal forces acting on the weights and resulting from variations in the engine speed, will cause pivotal displacement of the weights, which will in turn effect sliding movement of the sleeve 122 through the weight arms 129 acting on the sleeve flange 124. It will be observed that outward movement of the governor weights will displace the sleeve 122 outwardly of the cam shaft end 107, that is, to the left as the parts appear in Fig. 5, and that inward movement of these weights will not effect per se a reverse or inward displacement of the sleeve. This latter or return displacement of the sleeve is effected by means of a governor loading device presently to be described.

The outer end portion 130 of sleeve 122 operatively engages a cup shaped member 132, the connection being made through a journal device 133 of ball type, permitting rotation of the sleeve 122 relative to the member 132. The cup shaped member is provided with outstanding, spaced lugs 134 serving as guide members for the free end 135 of an arm element 136 disposed therebetween. The end 135 of arm 136 is, by preference, bifurcated, the furcate portions 137 providing bearing seats for a pin 138 rotatably supporting a roller element 139, the roller normally engaging the surface portion 140 of the member 132. The arm 136 is carried by and preferably forms a part of a frame 141, which is carried by and operatively connected to one end portion of a stub shaft 142. The shaft 142 is, by preference, journalled in ball bearing structures 143 carried by portions 144 of the engine frame. Thus the frame 141 is mounted for pivotal or rockable movement in response to actuation of the arm 136 by the governor mechanism above described. A lever arm 145 is operatively associated with the opposite end of shaft 142 and has its free end 146 pivotally connected to one end 147 of a longitudinally adjustable link structure 148. The longitudinal adjustment of link 148 may be effected in a well known manner, as at 149 (Figs. 1 and 2). The opposite end of the adjustable link 148 is pivotally connected to the end of a crank arm 150 which is operatively connected to one end of a control shaft 151. The control shaft 151, which is suitably journalled in bearings 152 carried by the engine frame, is operatively associated through suitable linkage elements 153 with the fuel regulating mechanism in the injection pump structures 14. As is known in the art, injection pumps of the general type illustrated, are usually characterized by a rotatable plunger, or sleeve associated therewith, so as to vary the cut-off point, and hence quantity of injection, according to placement of the linkage elements 153.

The loading means for the engine governor is comprised of a suitable tension spring 154, which is operatively associated with the rockable frame 141 in a preferred manner now to be described. The rockable frame is by preference formed to provide spaced guide or track elements 155 for rollers 156 (Figs. 1, 2 and 4), which are journalled upon a pin element 157 carried by a member 158. It will be noted that the track elements 155 extend outwardly from, and at a right angle to the frame pivot shaft 142, thus providing the frame with a lever arm structure for a purpose which will presently appear. The member 158 extends between the track elements 155, and is provided with a coarsely threaded connecting seat portion 159 for one end 160 of the governor spring 154. The opposite end 161 of the loading spring is secured to an adjustable mounting element 162 threadedly engaging an adjusting screw 163, the screw in the present example being carried by the journal portion 164 of a lever arm 165. The journal portion of the arm is operatively connected to the control shaft 64 as by a key 166, the arm being provided for a purpose presently appearing.

It will be observed from an inspection of Figs. 1 and 4, that the position of the member 158 and its rollers 156 longitudinally of the track elements 155, determines the degree of governor loading by the spring 154, as displacement of the rollers and member 158 along the track varies the length of the torque arm of the frame 141 about its pivotal support 142, and hence the loading of the governor elements 128 through the arm 136 and governor elements 132 and 122. When the axis of the rollers 156 coincides with the pivotal axis of the frame 141, a minimum governor loading obtains, and when the rollers are disposed near the outer or free end of the track elements, a maximum governor loading by the spring is attained.

In the control system thus far described, regulation of the fuel input to the injection pumps 14 is effected by the engine governor mechanism acting through the rockable frame or bell-crank 141. The function of the governor in this respect is independent of any other engine control mechanism, and its action is subject only to the counterforce of the loading of spring 154. The operation of the governor of course, is to regulate the quantity of fuel delivered by the injection pumps 14, so as to maintain the speed of the engine substantially constant notwithstanding fluctuations in engine loading. Where the engine may be conditioned for operation at a particular desired speed, as by the speed setting mechanism hereinabove described, the governor must be adjusted in accordance with the speed setting of the engine, so that it may function properly in maintaining such speed. In the present embodiment of the invention, the governor is conditioned for proper speed control by regulating the spring loading thereof in an improved manner departing from the conventional manner of varying governor spring loading. The action of the spring 154 is regulated by altering its lever arm connection to the governor, which is usually, but not necessarily accompanied by a change in the absolute tension or loading of the spring. Thus by shifting the spring supporting member 158 along the track elements 155, the loading of the governor may be readily increased or decreased. It has been found in practice that by regulating the governor loading in this manner, a superior speed regulation by the governor is attained over the entire operating range of the engine between no-load and full-load conditions.

Regulation of the lever arm for the spring 154 is attained through a suitable control member associated with the spring supporting elements and operated by the speed setting control mechanism. In the present example, the control member is found in the arm 165 above referred to, which has its end portion 168 extended through and between the track elements 155 (Figs. 1, 2 and 4). The arm end 168 is pivotally connected as by the pivot pin 169, to one end of a short link element 170. The opposite end of the link is pivotally connected to the roller bearing pin 157 carried by the spring supporting member 158. Thus the arm 165 is operatively connected to the spring, in such manner that pivotal movement of the arm resulting from actuation of the control shaft 64, will effect a displacement of the roller member 158 along the track 155. In this manner, adjustment of the governor is effected synchronously with the speed setting operation of the speed setting control mechanism.

It will be noted that the governor spring 154 is maintained in assembly and in operative position by the arm 165, as one end of the spring is connected to the hub or journal portion 164 of the arm, and the opposite spring end portion connected to the arm through the link element 170.

It is preferred in the present example, to provide an operative bias on the fuel control shaft 151, tending at all times to actuate the shaft in a direction to increase the admission of fuel to the injection pumps 14. The purpose of this biasing influence is to assist the speed regulating apparatus in maintaining operation of the engine at idling speed, when the control lever 40 is actuated to a position corresponding to idling speed. The bias is effected through a suitable tension spring 172, having one end connected to a portion 173 of the engine frame, and its opposite end connected to the free end 174 of a lever 175 secured to the control shaft 151. It will be noted that the bias of spring 172 aids the governor spring 154 in the control of the governor mechanism and fuel regulating shaft 151. Thus when the governor spring is adjusted relative to the pivoted frame or bell crank 141 so that its effect thereupon is a minimum, the auxiliary spring 172 serves to maintain a bias of the frame 141 counter to the action thereupon by the governor weights.

The present improved engine control system includes an independently operable control device for stopping or otherwise controlling engine operation by a direct manual actuation of the fuel control shaft 151. As shown in Fig. 1, there is provided an operating lever 177 connected to a stub shaft 178 which is journalled in a portion 179 of the engine frame. This stub shaft is operatively associated with the control shaft 151 through a coupling device 180, which may be of known type comprising spaced lugs 181 carried by the stub shaft, and a pin element 182 on the shaft 151 adapted to be engaged by the lugs. By operating the lever 177, from its neutral position shown in Fig. 1, the fuel control shaft may be actuated independently of the other controls. The spacing of the coupling lugs 181 is such that when the arm 177 is in neutral position, the shaft 151 may be operated through its control range by the primary and secondary engine controls, without the pin element 182 of the coupling engaging the lugs.

In the operation of the control system, when it is desired to condition the engine for operation at a particular engine speed, the control member 40 of the secondary or speed setting control mechanism is operated to a predetermined control position corresponding to the desired engine speed, and thus serves to effect actuation of the servo-motor valve mechanism. The speed setting control positions of the lever 40 along the rack member 44, corresponding to predetermined engine speeds, are preferably indicated by a suitable speed setting scale 185 which may be provided on the rack member 44. The scale may be provided with graduated speed indicia 186, indicating directly the speed setting of the engine when the lever 40 is in register with any one of the speed indicia. Movement of the valve plunger 36 by the lever 40 is effected through the pivotally connected elements 47, 48 and 50. Movement of the valve plunger 36 from its normally closed position in a direction to admit fluid to the motor cylinder, causes the piston to move outwardly of the cylinder, thereby effecting pivotal movement of arm 77 and hence rotation of control shaft 64. Outward movement of the motor piston causes the shaft 64 to rotate in a direction to effect a return of the valve plunger to its closed position, whereupon there ceases any further movement of the piston, arm 77 and control shaft 64. The return of the valve plunger to closed position by the shaft 64, is effected through the shaft collar 72, the extension 76 of lever element 48 pivotally connected thereto, and the link 50 connecting lever 48 with the valve plunger 36. It will be observed from the described structural arrangement of the speed setting mechanism or secondary control, that control movements of the valve plunger 36 by the lever 40 and by the shaft 64 are effected independently of each other. Further, the operative arrangement is such that for each speed setting actuation of the lever 40, the valve plunger 36 will be opened a certain amount sufficient to cause a change in the volume of fluid acting on the piston 28 of the servo-motor. As a result, the piston will be displaced until movement of the arm 77 and control shaft 64, as caused by the piston, effects a re-closure of the valve, whereupon further movement of the piston ceases. Actuation of the arm 77 and shaft 64 conditions the engine fuel control mechanism for operation of the engine at the speed indicated by the setting of the lever 40. Thus for each position of the lever 40, the piston 28 together with arm 77 and shaft 64, will be actuated to a predetermined position to adjust the fuel mechanism for determining the engine speed according to the speed setting of the lever 40. Hence the speed setting action of the secondary control mechanism may be initiated by the lever 40, and further action thereof automatically stopped by the action of shaft 64 when the desired speed setting of the engine fuel system is attained.

It will be noted that movement of arm 77 determines the pressure-setting of the injection nozzle devices 12, the adjustment thereof being effected through the arm 77, the plunger mechanism 79—88, lever 89 and bar 90 connected to the pressure regulating arms 24 of the nozzle devices 12, while rotation of shaft 64 regulates the timing of fuel injection through the phase shift of the cam shaft 18, as effected by the longitudinal shifting of the gear 22 by the arms 104 operated by the control shaft 64. Control movement of shaft 64 also effects, through the arm 165 and associated mechanism, adjustment of the primary or governor speed control, as by regulating or determining the effect of the governor spring 154 in the manner heretofore described.

Operation of the lever 40 in a manner to actuate the valve plunger 36 so as to vent the fluid in the motor cylinder 27, hence to release the fluid pressure on the piston 28, permits the spring 85 acting on the arm 77 through the plunger sleeve 83 and arm 79, to move the arm 77 and shaft 64 in a reverse direction until the shaft 64 effects a reclosure of the valve plunger 36. Thereafter, the adjustment of the system attained by such reverse movement of the arm 77 and shaft 64, is maintained until further control actuation of the lever 40.

The arrangement of the secondary or speed setting control mechanism is such that operation of of the control will condition the engine for operation at speeds ranging from a minimum or idling speed to the maximum speed of the engine to which the control system is applied. The preference is that normally, the secondary control will not operate to stop the engine, but when the engine is operating under substantially full load, actuating the secondary control to reduce the engine speed to idling may cause the engine to stall, in which case the engine will stop. Stopping of the engine is preferably provided for by the positive control 177 heretofore described, although may, if desired, be cared for by the secondary control.

As before described, a slight leakage of fluid occurs past the servo-motor piston, which is compensated for by the correspondingly slight normal inflow of fluid past the motor valve into the cylinder 27. This leakage does not in any way affect the control operation of the servo-motor. This leakage does however serve a well defined purpose in the present control system, in that, in the event of a failure of fluid pressure in the engine lubrication system from any cause, the slight inflow of fluid to the cylinder chamber 27 compensating for the leakage past the piston immediately ceases. The leakage past the piston continues, however, and initiates a reduction of the fluid pressure in the cylinder. Thus, the piston may be displaced inwardly of the cylinder under the action of the spring 85 acting on the arm 77, until all the fluid in the cylinder has been forced out past the piston. The action of the spring 85 in displacing the piston, also actuates the control shaft through the arm 77, whereby the secondary control mechanism is operated to reduce the engine speed to a minimum or idling speed. In the mechanism described, the counter force of the spring 85 is sufficient to effect a rapid exhaustion of the fluid in the cylinder, hence to effect a rapid or sudden decrease in engine speed. The rate of exhaustion of fluid from the cylinder is further augmented by the opening of the valve 34 as a result of the operation of control shaft 64. Under these conditions, should the engine be operating at substantially full load, the sudden reduction of the engine speed to idling may stop the engine entirely, as by causing the engine to become stalled. When the pressure of the lubricating system has been restored, the control system will obviously again be conditioned for further operation of the engine.

In order to make more definite and certain, some of the terminology employed in the present description and claims in reference to parts of the system and their operation, it may be noted that the language utilized in describing the timing of injection, assumes for exemplification a substantially constant injection pump plunger stroke, but denotes a variation of the timing of such stroke in relation to the movement and position of the piston in the power cylinder supplied from the associated pump. Those portions of the description and claims making reference to quantity of fuel input, or to fuel cutoff, are utilized illustratively herein to indicate either the variation in time of initiating delivery of fuel by the pump to the injector, or the terminatior of such fuel delivery, and has to do with a variation in quantity of fuel discharged by the pump, which under the control system described herein is or may be a variable irrespective of the constant stroke of the injection pump plunger. The frequent references herein to variation of injection pressure, or the use of similar terminology, has reference in the present embodiment of the invention, to a variation in injector spring-loading, the practice of varying the loading of an injector spring being of itself well known for the purpose of increasing or decreasing the pressure at which the fuel is admitted to the cylinder in solid injection fuel supply systems.

The presently described unified engine speed control system, wherein the actuation of a single operator device effects adjustments of the fuel feeding mechanism so as to condition the engine for operation at a desired engine speed, and further, wherein the engine governor, once the engine speed is determined, operates independently of the speed setting control to maintain substantially constant the speed of the engine irrespective of load fluctuations upon the engine, fully attains the foregoing and other objects, and provides for a positive regulation and nicety of control of engine operation. It will be observed from the described and illustrated structural arrangement of the elements selected and assembled to exemplify the arrangement, that the control system readily lends itself to a compact and simplified assembly, thereby minimizing space requirements for the complete system.

It is to be understood that the present description relates only to a preferred embodiment of the invention, and that alterations and modifications in the elements and arrangement thereof may be made without departing from the spirit and full intended scope of the invention, as defined by the appended claims.

I claim:

1. In an internal combustion engine of solid fuel injection type, having a plurality of cylinders, injection nozzle devices for said cylinders, each thereof having a pressure regulating arm, a control lever common to said arms, actuating means for said lever including a pivotally mounted member connected to said lever and a hydraulically operated device acting on said member, and spring means carried by said control lever and operable in opposition to said hydraulic device, said spring means being adapted to actuate said lever responsively to predetermined pressure conditions in said hydraulic device, to effect substantially minimum fuel pressure positions of said nozzle devices.

2. In an internal combustion engine of solid fuel injection type, having a plurality of cylinders, injection nozzle devices for the cylinders, each thereof having a pressure regulating arm, a control lever common to said arms, control means for said lever including a hydraulically operated device and connections therebetween, fuel pumps for delivering fuel to said nozzle devices, governor mechanism controlling operation of said pumps, loading means connected to the governor as a part of the governor assembly, regulating mechanism for said governor loading means, operated by said hydraulic device, and spring means operatively associated with said nozzle control lever, adapted to actuate said lever and governor loading regulating mechanism responsively to predetermined pressure conditions in said hydraulic device, to effect minimum fuel pressure positions of said nozzle devices and minimum loading of the governor.

3. In an internal combustion engine of solid fuel injection type, having a plurality of cylinders, injection nozzle devices for the cylinders, each thereof provided with a pressure regulating arm, a control lever common to said arms, a control shaft, a member connecting said control shaft to said lever, fuel pumps for delivering fuel to said injection nozzles, governor mechanism operatively associated with said pumps, for regulating the amount of fuel delivered by the pumps, a second member on said control shaft, governor loading means carried by said second member and operatively associated with said governor as a functional governor element, hydraulic operating means for said control shaft, and a spring carried by said control lever and arranged to oppose said hydraulic means, said spring being adapted to actuate said lever and said control shaft responsively to predetermined pressure conditions in said hydraulic means, to effect minimum fuel pressure positions of said nozzle devices and a minimum loading position of said loading means relative to the governor.

4. In an internal combustion engine of solid fuel injection type, a fuel pump for supplying fuel under pressure to said engine, an engine driven cam shaft for operating said pump, a fuel pump governor mechanism including centrifugally actuated weights carried by said cam shaft, a control shaft, an arm connected thereto and arranged at substantially a right angle to said cam shaft, the governor further including loading means carried by said arm, a pivoted lever operatively connected to the governor mechanism and providing a track portion, and roller means on said control shaft arm, engaging said track portion and displaceable therealong in response to movement of said control shaft and arm, whereby to vary the loading on said gvernor by said loading means.

5. In an internal combustion engine of solid fuel injection type, a fuel pump for supplying fuel to the engine, an engine driven cam shaft for operating said pump, a fuel pump governor mechanism including centrifugally operated weights carried by one end of said cam shaft, a control shaft, an arm connected thereto and extending at substantially a right angle to said cam shaft, governor loading means carried entirely by said arm, a pivoted member connected to said governor and provided with a lever, and means connecting said loading means to said lever, said means being displaceable responsively to movement of said control shaft and arm, along said lever and through the pivotal axis of said pivoted member, whereby to provide a wide range of governor loading including zero loading.

6. In an internal combustion engine of solid fuel injection type, an injection nozzle device associated with a cylinder of the engine, a fuel pump for delivering fuel to the injection nozzle, a cam shaft for operating said fuel pump, an engine driven element, means including spiral gears, operatively connecting the engine driven element and cam shaft, one of said gears being axially shiftable to effect angular displacement of said cam shaft relative to said engine driven element, whereby to effect a regulation in timing of fuel delivery by the pump, a control shaft, an arm on said shaft connected to said shiftable gear for control thereof, fuel pump governor mechanism including centrifugally actuated weights carried on said cam shaft, a second arm on said control shaft, governor loading means carried by said arm and connections therefrom to said governor, an injection pressure regulating lever on said nozzle device, a third arm on said control shaft and connections between said last arm and said regulating lever, hydraulically operated means connected to said third arm, adapted for actuating said control shaft, and a spring associated with said third arm and acting in opposition to said hydraulic means, said spring being adapted for actuating said control shaft in response to a predetermined pressure condition in said hydraulic means, to effect through said control shaft arms, regulation of delivery pressure through said nozzle device, as well as the regulation of the governor loading means and the angular displacement of said cam shaft, to provide minimum fuel feeding conditions thereof.

TAGE V. PEDERSEN.